US012034855B2

(12) United States Patent
Gardner

(10) Patent No.: US 12,034,855 B2
(45) Date of Patent: *Jul. 9, 2024

(54) SYSTEMS AND METHODS FOR TYING TOKEN VALIDITY TO A TASK EXECUTED IN A COMPUTING SYSTEM

(71) Applicant: SHOPIFY INC., Ottawa (CA)

(72) Inventor: Alysha Gardner, Ottawa (CA)

(73) Assignee: SHOPIFY INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/522,305

(22) Filed: Nov. 9, 2021

(65) Prior Publication Data
US 2022/0069997 A1  Mar. 3, 2022

Related U.S. Application Data

(63) Continuation of application No. 16/401,608, filed on May 2, 2019, now Pat. No. 11,201,739.

(51) Int. Cl.
*H04L 9/32* (2006.01)
*G06F 9/48* (2006.01)
*G06F 9/50* (2006.01)

(52) U.S. Cl.
CPC .......... *H04L 9/3213* (2013.01); *G06F 9/4831* (2013.01); *G06F 9/485* (2013.01); *G06F 9/5022* (2013.01)

(58) Field of Classification Search
CPC .......................... H04L 9/3213; H04L 9/3247
See application file for complete search history.

(56) References Cited

U.S. PATENT DOCUMENTS

| 8,752,203 | B2* | 6/2014 | Reinertsen | G06F 21/34 726/28 |
| 2013/0198540 | A1* | 8/2013 | Lee | G06F 1/3243 713/320 |
| 2014/0208119 | A1 | 7/2014 | Chang et al. | |
| 2016/0072839 | A1 | 3/2016 | Mortimore, Jr. | |
| 2017/0093844 | A1 | 3/2017 | Chambliss et al. | |
| 2017/0277900 | A1* | 9/2017 | Tong | H04L 9/40 |

(Continued)

OTHER PUBLICATIONS

Jones, Michael B., Bradley, John, and Sakimura, Nat. "JSON Web Token (JWT)", published online in May 2015. Available from https://tools.ietf.org/html/rfc7519. Last accessed online in Jun. 2019. 30 pages.

(Continued)

*Primary Examiner* — Jorge A Chu Joy-Davila

(57) ABSTRACT

It is desired to try to increase the security of a computing system running computer applications that may access data in a data storage system. In some embodiments, a token associates a user with a task that is being executed by a computing node. It may therefore be possible to determine which user executed which tasks. In some embodiments, the validity of a token is tied to the lifespan of a task associated with the token, rather than to a fixed amount of time. Therefore, if the task associated with the token is complete, the token may become invalid, rather than remaining valid for a duration of time that possibly exceeds the lifespan of the associated task. In some embodiments, a token is used to enforce data access control, e.g. to deny certain users access to certain data in the data storage system.

21 Claims, 12 Drawing Sheets

(56) References Cited

U.S. PATENT DOCUMENTS

| | | |
|---|---|---|
| 2018/0137512 A1 | 5/2018 | Georgiadis et al. |
| 2018/0295126 A1 | 10/2018 | Gilpin |
| 2018/0324173 A1 | 11/2018 | Ananthapur Bache et al. |
| 2018/0332629 A1* | 11/2018 | Huang ................. H04W 48/18 |
| 2020/0099691 A1* | 3/2020 | Akselrod ............. H04L 63/083 |
| 2020/0351090 A1 | 11/2020 | Gardner |
| 2020/0351091 A1 | 11/2020 | Gardner |
| 2021/0250344 A1* | 8/2021 | Qi ........................ H04W 12/06 |

OTHER PUBLICATIONS

Neuman, Clifford, et al. "The Kerberos Network Authentication Service (V5)", published online in Jul. 2005. Available from https://tools.ietf.org/html/rfc4120. Last accessed online in Jun. 2019. 138 pages.

Non-Final Rejection issued on U.S. Appl. No. 16/401,606, dated May 13, 2021, 17 pages.

* cited by examiner

| E-Commerce Platform | Q Search | | JG John's Apparel Jonny B. Good |
|---|---|---|---|

⌂ Home
⇄ Orders
◇ Products
○ Costumers
⎐ Reports
⚙ Discounts
⊞ Apps

SALES CHANNELS ⊕
⬢ Online Store
☐ Mobile App
View all channels

⚙ Settings

Good afternoon, Jonny B..
Here's what's happening with your store today.

Today's total sales    Today's visits
$98.00                 1

● Update your Platform Payments tax details
We require additional information to verify your identity.
[Update tax details]

● Advanced Cash on Delivery has been deactivated for your store
[See why]

● Pinterest has been disabled. Review its eligibility requirements to find out how to enable it again.

All channels ⌄          Today ⌄

TOTAL SALES
$98.00                              Jun 1
                                    2 orders
$125
$75
$25
      12am    8pm  4pm  11pm TOTAL SALES BY CHANNEL    View dashboard
                          Jun 1
Online Store          0 orders
$0.00

Mobile app
$0.00                     0 orders

Shopify POS (126 York St.)
$0.00                     0 orders

FIG. 2

SYSTEMS AND METHODS FOR TYING TOKEN VALIDITY TO A TASK EXECUTED IN A COMPUTING SYSTEM

CROSS-REFERENCE TO RELATED APPLICATIONS

This application is a continuation of U.S. patent application Ser. No. 16/401,608, entitled "Systems and Methods for Tying Token Validity to a Task Executed in a Computing System", which was filed on May 2, 2019, the contents of which are incorporated herein by reference in their entirety.

FIELD

The present application relates to security in a computing system that executes computing tasks.

BACKGROUND

A data storage system is a system used to store large amounts of data. An example is the cloud data storage system offered by Google™ Cloud Platform™ service. The data stored in a data storage system may be accessed by computer applications, e.g. via read and/or write operations. For example, a user may write a computer application to access data from the data storage system and perform analysis and computations using the data. The application may consist of one or more tasks.

The computing resources used to access the data and execute applications may be distributed. Distributed computing resources may consist of several computing nodes managed by a master resource manager (RM). Each computing node has computing resources, and the master RM tracks the computing resources and manages work by assigning applications or tasks to nodes. YARN™ is an example of a system for managing distributed computing resources. YARN™ includes a master YARN™ RM that manages nodes. Each node has one or more containers. A container is an allocation of memory and computing resources that may be used to execute a task.

Some computer applications involve multiple tasks organized in a workflow, e.g. the start of one task depends upon the completion of a previous task. A workflow scheduler may be used to manage the workflow. Oozie™ is an example of a workflow scheduler.

When data is being accessed by a computer application, a token may be used as a security measure. A token may comprise information that needs to be presented in order to access a resource. For example, a node task wishing to access stored data may first need to present a valid data access token to the data storage system.

It is desired to try to increase the security of a computing system running computer applications that may access data in a data storage system.

SUMMARY

In some embodiments, systems and methods are disclosed in which a token associates a user with a task that is being executed by a computing node. It may therefore be possible to determine which user executed which tasks, which may also reveal which data was accessed by the user.

In some embodiments, systems and methods are disclosed in which the validity of a token is tied to the lifespan of a task associated with the token, rather than to a fixed amount of time. Therefore, if the task associated with the token is complete, the token may become invalid, rather than remaining valid for a duration of time that possibly exceeds the lifespan of the associated task.

In some embodiments, systems and methods are disclosed in which a token is used to enforce data access control, e.g. to possibly deny certain users access to certain data in the data storage system.

In some embodiments, the methods may be performed within an e-commerce platform. For example, data related to merchants, buyers, transactions, etc. may be stored in a data storage system as part of the e-commerce platform. Users may then submit computer applications that, when executed, access the stored data to perform data analysis. The computer applications may be executed on distributed computing resources that may be part of the e-commerce platform.

According to one embodiment, there is provided a method performed by a computing node in a computing system. The method may include receiving at the computing node: (i) information that identifies a user, and (ii) a task originating from the user that is scheduled for execution on the computing node. The method may further include transmitting a request for a task token to a server. The task token is a token specific to the task. The request for the task token may include: (i) the information that identifies the user, and (ii) a task identifier (ID) that identifies the task. The method may further include receiving the task token from the server. The task token may incorporate the information that identifies the user and the task ID, and the task token may be digitally signed. The method may further include executing the task on the computing node. Executing the task may include transmitting a request for a data access token to the server. The data access token is a token required to access data stored in a data storage system, and the request for the data access token includes the task token. In response to transmitting the request for the data access token, the method may further include receiving the data access token from the server. The method may further include accessing the data from the data storage system using the data access token. A computing node configured to perform the method is also provided.

According to another embodiment, there is provided a method performed by a server in a computing system. The method may include receiving a request for a task token from a computing node. The task token is a token specific to a task scheduled for execution on the computing node. The request for the task token includes a task ID that identifies the task. The method may further include digitally signing at least the task ID to obtain a digital signature, and incorporating the task ID and the digital signature into the task token. The method may further include transmitting the task token to the computing node. The method may further include subsequently receiving a request for a data access token from the computing node. The data access token is a token required to access data stored in a data storage system, and the request for the data access token includes the task token. The method may further include verifying the digital signature of the task token received in the request for the data access token. The method may further include extracting the task ID from the task token received in the request for the data access token. The method may further include transmitting a message to a computing device. The message includes the task ID, and the message may query whether the task identified by the task ID is still being executed by the computing node. The method may further include receiving a response from the computing device. The response indicates that the task identified by the task ID is still being executed by the computing node. The method may further include sending the data access token to the computing node subsequent to receiving the response. A server configured to perform the method is also provided.

BRIEF DESCRIPTION OF THE DRAWINGS

Embodiments will be described, by way of example only, with reference to the accompanying figures wherein:

FIG. 2 is an example of a home page of an administrator, according to one embodiment;

DETAILED DESCRIPTION

For illustrative purposes, specific example embodiments will now be explained in greater detail below in conjunction with the figures.

Example e-Commerce Platform

In some embodiments, the methods disclosed herein may be performed on or in association with an e-commerce platform. Therefore, an example of an e-commerce platform will be described.

Figure 1:
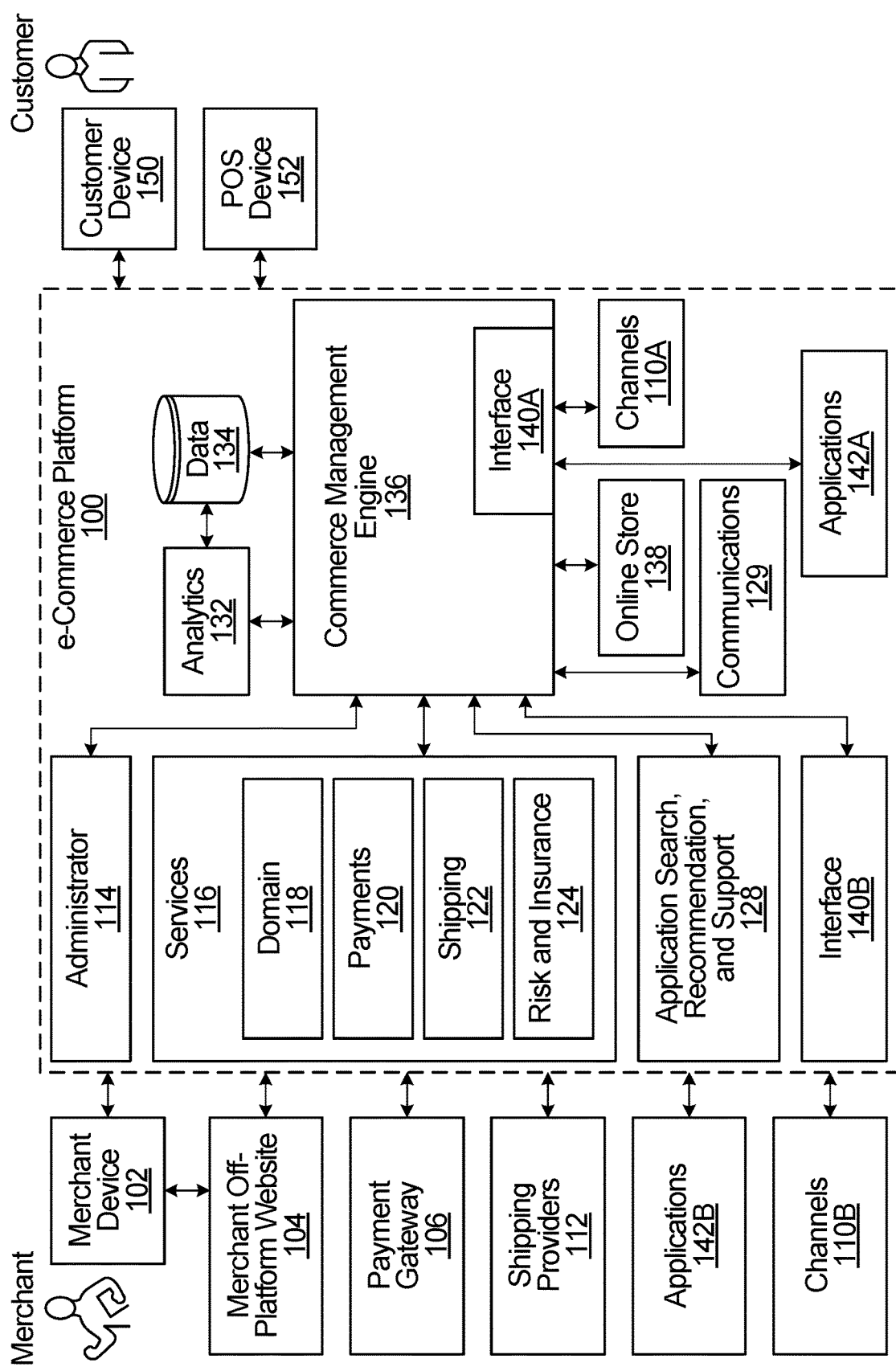
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Data Collection and Analysis in the e-Commerce Platform

Figure 3:
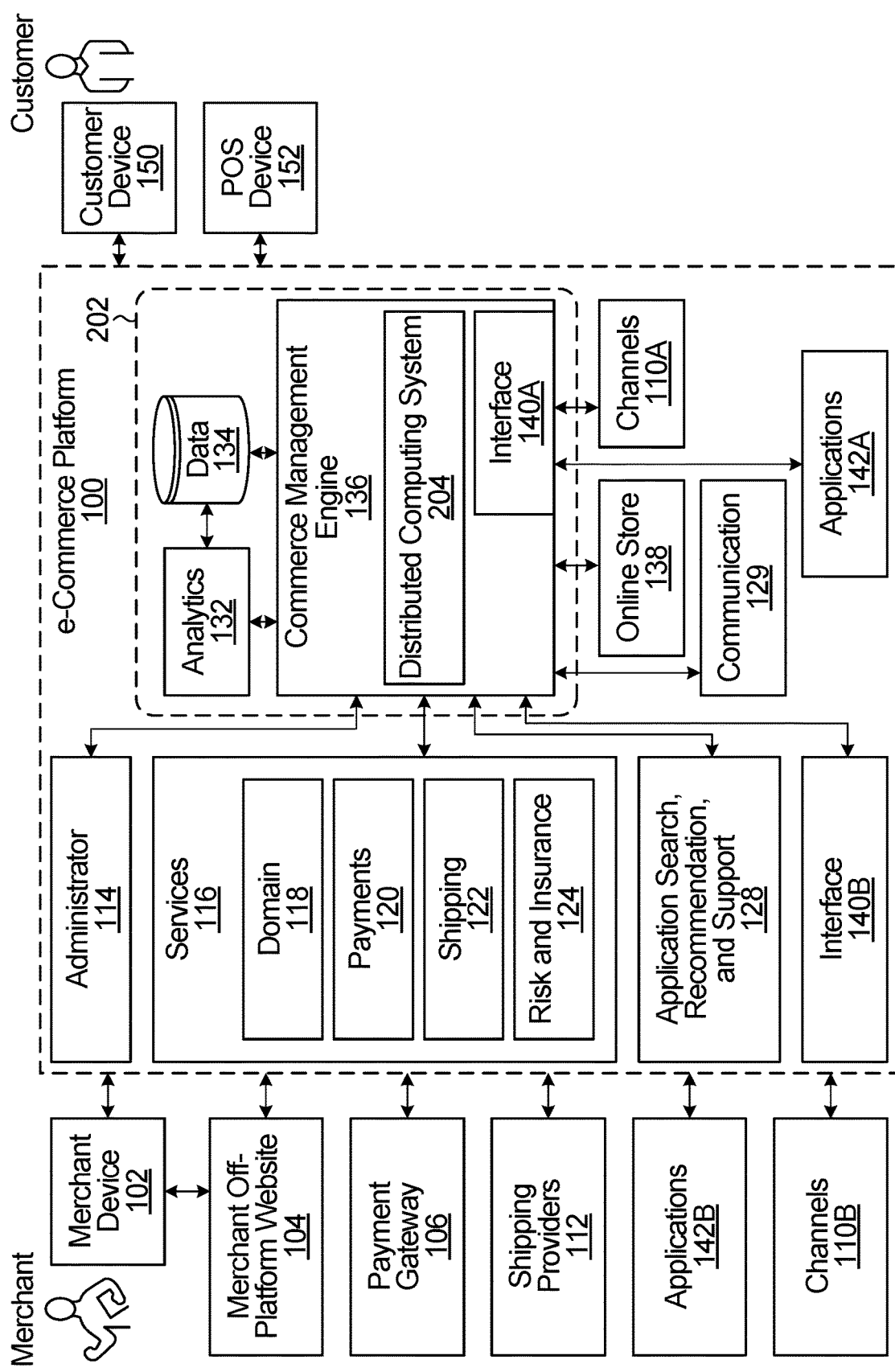
FIG. 3 is a block diagram of an e-commerce platform, according to another embodiment.

In some embodiments, data related to merchants, buyers, transactions, etc. may be stored in a data storage system as part of the e-commerce platform 100. Users (e.g. data scientists) may submit computer applications that, when executed, access the stored data to perform data analysis. The computer applications may be executed on computing resources that may be part of the e-commerce platform 100. The computing resources may be distributed. For example, FIG. 3 illustrates the e-commerce platform 100 of FIG. 1, but with a stippled box 202 encompassing the commerce management engine 136, data facility 134, and analytics 132. Data related to merchants, buyers, transactions, etc. may be stored in data facility 134. The data facility 134 may be implemented as distributed data storage. Computer applications may be executed in the commerce management engine 136 to produce analytics 132. The computer applications may be submitted to the commerce management engine 136 by users, e.g. through a user interface, such as a display. The computer applications may consist of one or more tasks. When a task is being executed, it may be necessary to access data stored in the data facility 134. For security purposes, a data access token may need to be obtained and submitted to the API of data facility 134 in order to be able to access the data stored in the data facility 134. For example, the data access token may act as an assurance that the executing task has permission to access the data. The computing resources that execute the tasks in the commerce management engine 136 may be distributed computing resources, e.g. distributed computing resources 204 shown in FIG. 3.

It is desired to try to increase security in relation to the computer applications that access the data in the data storage facility 134. Embodiments are described below in which: (1) a token associates a user with a task that is being executed by a computing node; and/or (2) the validity of a token is tied to the lifespan of a task associated with the token, rather than to a fixed amount of time; and/or (3) a token is used to enforce data access control.

However, although the embodiments described below may be implemented in association with an e-commerce platform (e.g. e-commerce platform 100, as in FIG. 3), the embodiments described below are not limited to implementation in an e-commerce platform. Rather, most of the embodiments described below may be implemented in any system in which computer tasks execute on one or more computers and access data stored in a data storage system. Therefore, the remaining explanation will not be tied to an implementation in an e-commerce platform.

Use of Task-Specific Tokens

Figure 4:
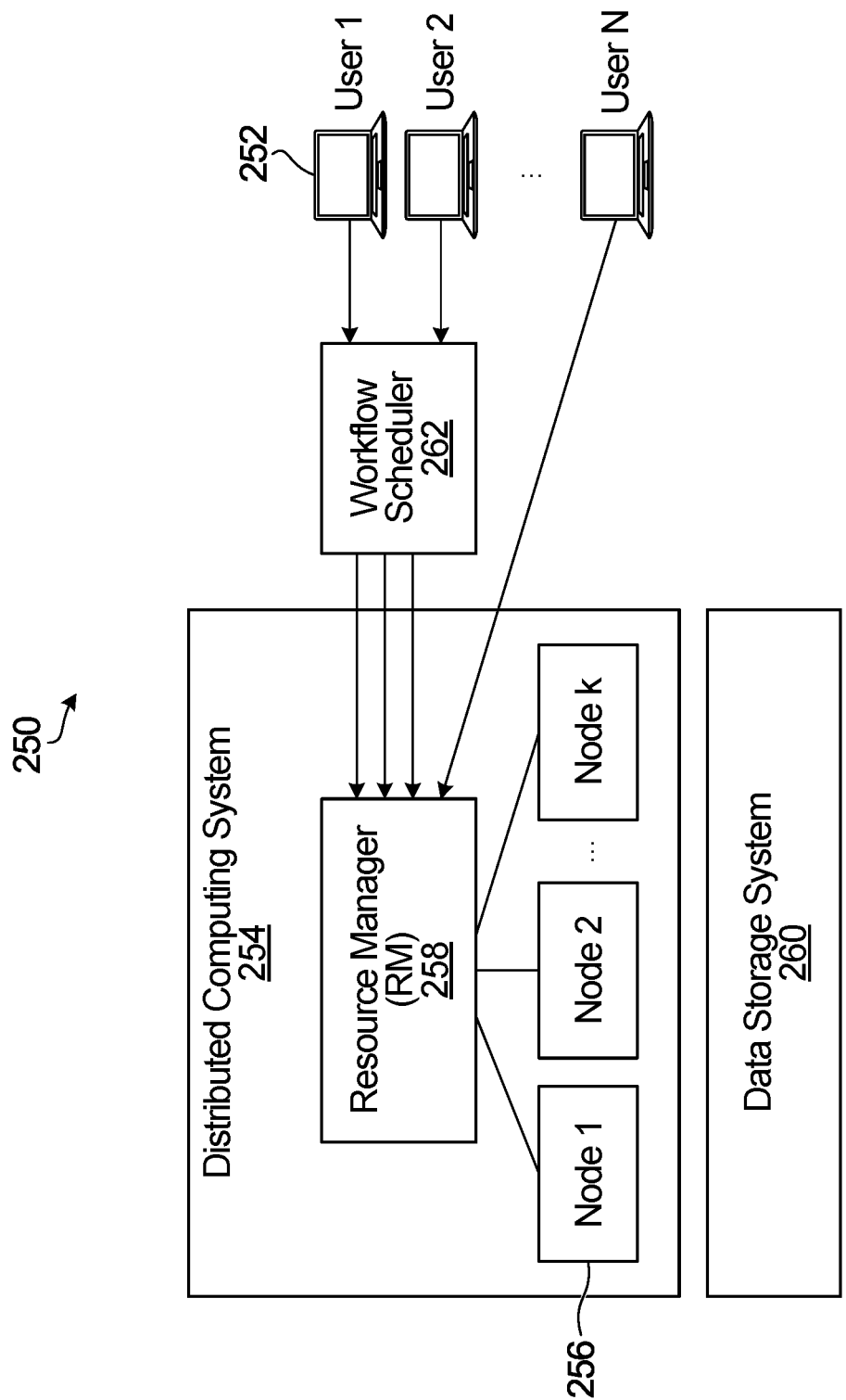
FIG. 4 illustrates a system for executing computer applications submitted by user devices, according to one embodiment.

FIG. 4 illustrates a system 250 for executing computer applications submitted by user devices, according to one embodiment. The system 250 includes a plurality of different user devices, labelled user 1 to user N. Reference character 252 is used to generically indicate any one user device of the plurality of different user devices. For example, reference character 252 is used to indicate user device 1 in FIG. 4, but this is only an example.

A distributed computing system 254 is included as part of the system 250. The distributed computing system 254 includes a plurality of different computing nodes, labelled node 1 to node K. Reference character 256 is used to generically indicate any one computing node of the plurality of different computing nodes 1 to K. For example, reference character 256 is used to indicate computing node 1 in FIG. 4, but this is only an example. The computing nodes are distributed and managed by a resource manager 258.

A data storage system 260 is included as part of the system 250. The data storage system 260 stores data. The data storage system 260 may be a distributed data storage system.

A workflow scheduler 262 is included as part of the system 250. The workflow scheduler 262 can accept workflows from at least some of the plurality of user devices and submit applications or tasks for execution to the distributed computing system 254.

In operation, a user device 252 may submit an application for execution directly to the distributed computing system 254. The application includes one or more application tasks to be executed by the distributed computing system 254. Alternatively, the user device 252 may submit a workflow to the workflow scheduler 262. The workflow scheduler 262 is typically used when the user device 252 has multiple applications or application tasks organized in a particular flow, e.g. the start of one task depends upon the completion of a previous task. The workflow scheduler 262 manages the workflow and submits applications or tasks to the distributed computing system 254.

As used herein, a "task" refers to a particular job to be executed by one or more computing resources of the distributed computing system 254. The task may be in the form of computer code that is to be executed by one or more processors. A task may sometimes be called an "application task". An application includes one or more tasks. If an application includes only one task, then the task may be the application itself. An application may sometimes be called a "computer application".

The resource manager 258 assigns computational resources to execute tasks. For example, the resource manager 258 may implement a scheduler that tracks available computing resources on the computing nodes 1 to K, and allocates (i.e. schedules) computing resources to run tasks. The scheduler may be responsible for deciding which tasks are executed, which node or nodes are used to execute which tasks, and when to execute each task based on task priority. The scheduler may track resource consumption/availability at each computing node. In some embodiments, the scheduler may implement an algorithm that aims to optimize utilization by using as many computing resources as possible given various constraints. Example constraints include fairness to users and capacity guarantees. The resource manager 258 may further implement operations such as tracking available computing nodes, registering new nodes, communicating with the user devices or the workflow scheduler 262, etc.

When a computing node 256 has available resources, a task may be assigned by the resource manager 258 and transmitted to the computing node 256 for execution. In some embodiments, related tasks may be sent for execution to other computing nodes, e.g. for parallel execution. Execution of a task at a computing node 256 may involve the computing node 256 having to access data from the data storage system 260 as part of the task. "Accessing data" as used herein encompasses a data read (i.e. retrieving data from the data storage system 260) and/or a data write (i.e. storing data in the data storage system 260).

In some embodiments, the distributed computing system 254 in FIG. 4 may be the distributed computing system 204 in FIG. 3, and the data storage system 260 in FIG. 4 may be implemented in or as data facility 134 in FIG. 3. In other embodiments, the system 250 in FIG. 4 is not even associated with an e-commerce platform. In particular, many of the embodiments described below are not limited in any way to an e-commerce system or platform and work in any system in which tasks are executed and data is accessed.

Figure 5:
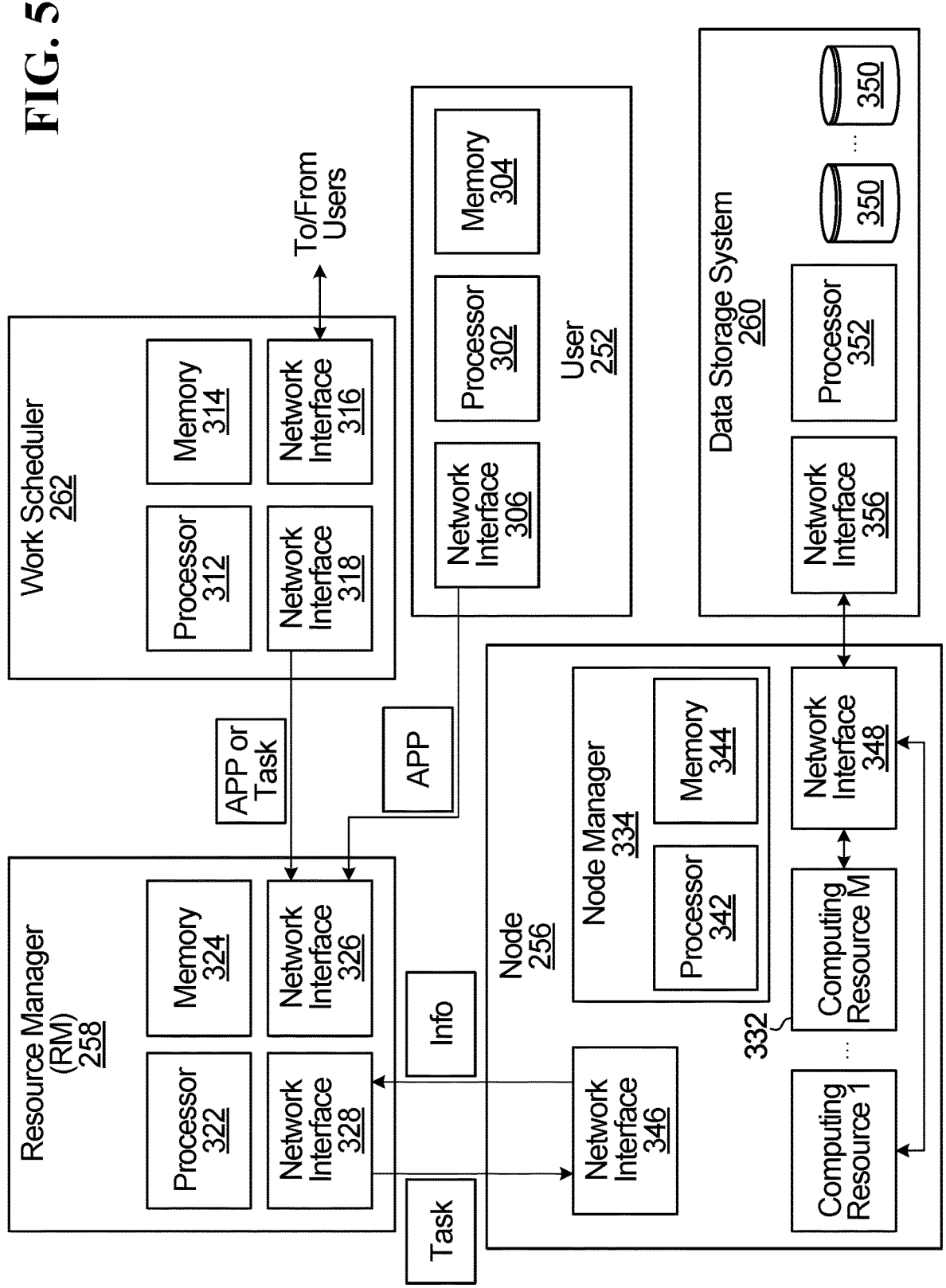
FIG. 5 illustrates one example of a user device, a workflow scheduler, a resource manager, a computing node, and a data storage system.

FIG. 5 illustrates one example of a user device 252, the workflow scheduler 262, the resource manager 258, a computing node 256, and the data storage system 260.

The user device 252 is the computing device having the application that is for execution in the distributed computing system 254. For example, the user device 252 may be the computer used by a human (e.g. data scientist) to write the application.

The user device 252 includes a processor 302 for performing the operations of the user device 252 and an associated memory 304 (e.g. to store applications and data). The processor 302 may be implemented by one or more processors that execute instructions stored in the memory 304. Alternatively, some or all of the processor 302 may be implemented using dedicated circuitry, such as an application specific integrated circuit (ASIC), a graphics processing unit (GPU), or a programmed field programmable gate array (FPGA).

The user device 252 further includes a network interface 306 to perform communication over a network, e.g. to transmit the application to the resource manager 258 for execution. The user device 252 may include other components that are not illustrated, e.g. a user interface, such as a display screen and/or keyboard for interfacing with a human. The user device 252 is associated with user credentials, e.g. a user ID. The user ID may be associated with user login credentials, such as a user name and user password. For example, to submit an application to be executed, the user device 252 may need to provide a user ID that is authentic and unique to the user. The user ID may be associated with user login information, which may ultimately have been provided by a human user through a user interface of the user device 252.

The workflow scheduler 262 includes a processor 312 for performing the operations of the workflow scheduler 262 and an associated memory 314 (e.g. to store applications, tasks, data, etc.). The processor 312 may be implemented by one or more processors that execute instructions stored in the memory 314. Alternatively, some or all of the processor 312 may be implemented using dedicated circuitry, such as an ASIC, GPU, or FPGA. The workflow scheduler 262 further includes a first network interface 316 for communicating with user devices over a network, and a second network interface 318 for communicating with the resource manager 258 over a network. The first network interface 316 and the second network interface 318 may be a same network interface. Operations performed by the processor 312 include accepting workflows from user devices, managing the workflows, and submitting applications or tasks to the resource manager 258. All of the operations performed by the workflow scheduler 262 and described herein are either directly performed by the processor 312 or controlled and coordinated by instructions issued by the processor 312.

The resource manager 258 includes a processor 322 for performing the operations of the resource manager 258 and an associated memory 324 (e.g. to store applications, tasks, data, etc.). The processor 322 may be implemented by one or more processors that execute instructions stored in the memory 324. Alternatively, some or all of the processor 322 may be implemented using dedicated circuitry, such as an ASIC, GPU, or FPGA. The resource manager 258 further includes a first network interface 326 for communicating with user devices and the workflow scheduler 262 over a network, and a second network interface 328 for communicating with the plurality of computing nodes, including computing node 256, over a network. The first network interface 326 and the second network interface 328 may be a same network interface. Operations performed by the processor 322 include the scheduling of tasks described earlier. All of the operations performed by the resource manager 258 and described herein are either directly performed by the processor 322 or controlled and coordinated by instructions issued by the processor 322.

The computing node 256 includes a plurality of computing resources 1 to M. Reference character 332 is used to generically indicate any one computing resource of the plurality of different computing resources 1 to M. For example, reference character 332 is used to indicate computing resource M in FIG. 5, but this is only an example. A computing resource 332 is an allocation of processor resources and memory resources (e.g. CPU and memory) that can be used to execute a particular task, e.g. a task scheduled by the resource manager 258. The computing node 256 includes a node manager 334 to receive instructions from the resource manager 258 and manage the computing resources 1 to M of the computing node 256. The node manager 334 includes a processor 342 for performing the operations of the node manager 334 and an associated memory 344. The processor 342 may be implemented by one or more processors that execute instructions stored in the memory 344. Alternatively, some or all of the processor 342 may be implemented using dedicated circuitry, such as an ASIC, GPU, or FPGA. The computing node 256 further includes a first network interface 346 for communicating with the resource manager 258 over a network, and a second network interface 348 for communicating with the data storage system 260 over a network. The first network interface 346 and the second network interface 348 may be a same network interface. The operations performed by the computing node 256 are either directly performed by the processor 342 or controlled and coordinated by instructions issued by the processor 342.

The data storage system 260 includes memory 350 for storing data. The memory 350 may be distributed. The data storage system 260 further includes a network interface 356 for communicating with computing nodes, including computing node 256, over a network. For example, a request to access data stored in the memory 350 may be received from computing node 256 over the network interface 356, and data read from the memory 350 may be transmitted to the computing node 256 over the network interface 356. The data storage system 260 further includes a processor 352 for performing the operations of the data storage system 260 described herein. The processor 352 may be implemented by one or more processors that execute instructions stored in the memory 350. Alternatively, some or all of the processor 352 may be implemented using dedicated circuitry, such as an ASIC, GPU, or FPGA.

Figure 6:
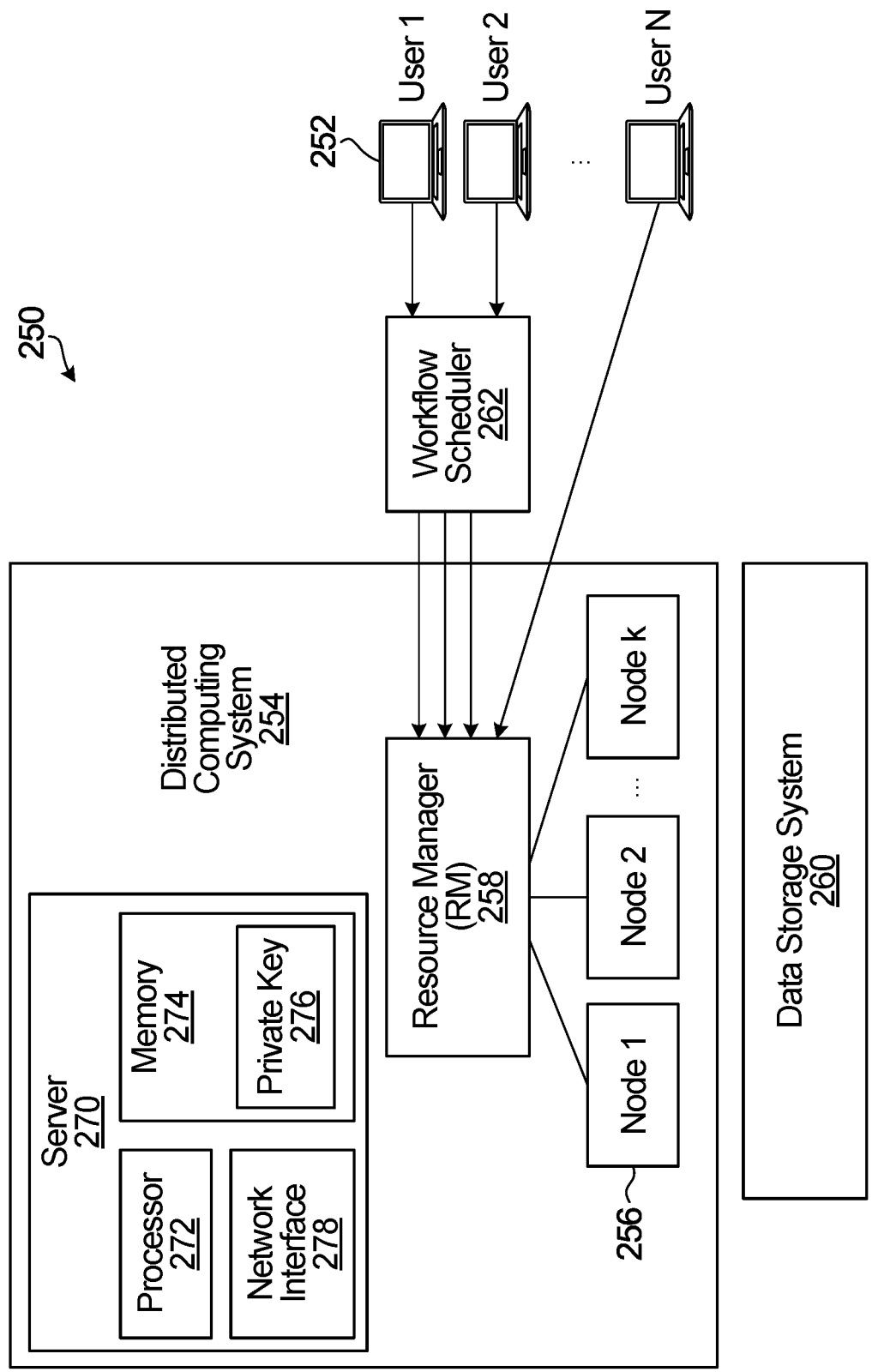
FIG. 6 illustrates the system of FIG. 4, but in an embodiment in which the distributed computing system further includes a server.

FIG. 6 illustrates the system 250 of FIG. 4, but in an embodiment in which the distributed computing system 254 further includes a server 270. Depending upon the implementation, the server 270 is able to communicate with: the resource manager 258; and/or one or more of computing nodes 1 to K; and/or workflow scheduler 262; and/or one or more of user devices 1 to N. In some implementations, the server 270 may also be able to communicate with the data storage system 260. As explained in detail below, in some embodiments the server 270 issues tokens that are tied to information that identifies a user (e.g. tied to a user ID). In some embodiments, the server 270 checks the validity of a token associated with a task, e.g. to check that the task associated with the token is still being executed. In some embodiments, the server 270 checks whether a user has permission to access data in the data storage system 260. The server 270 includes a processor 272 and a memory 274. Stored in the memory 274 is a private key 276, which is used for digitally signing in the manner explained below. The server 270 further includes a network interface 278 for communicating over a network, e.g. to send messages to/receive messages from: the resource manager 258, and/or a computing node 256, and/or the workflow scheduler 262, and/or a user device 252. The processor 272 performs the operations of the server 272 described herein, e.g. the generation of tokens, validating tokens, checking token validity, checking user permission to access data, the issuance of data access tokens, etc. The processor 272 may be implemented by one or more processors that execute instructions stored in the memory 274. Alternatively, some or all of the processor 272 may be implemented using dedicated circuitry, such as an ASIC, GPU, or FPGA.

In operation, a task originating from a user device 252 is to be executed by the distributed computing system 254. For example, the user device 252 may have submitted an application to the distributed computing system 254, and the application includes or consists of a task that is to be executed. The task originates from a user on user device 252 and therefore that task is associated with information identifying the user. In one embodiment, the information identifying the user is user credentials, e.g. a user ID. User ID will be used in the example embodiments below. The resource manager 258 schedules the task for execution on computing node 256.

Figure 7A:
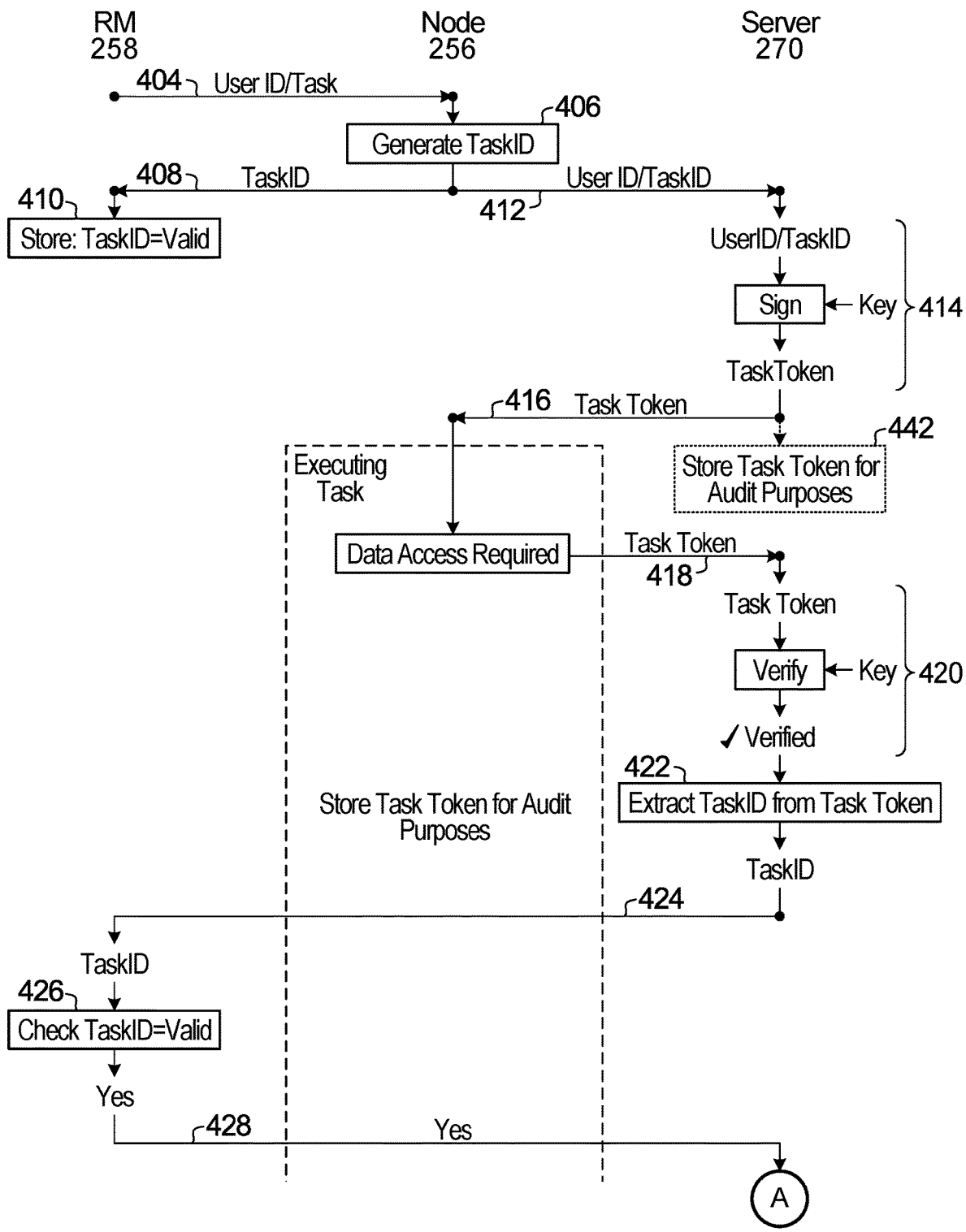
FIG. 7, consisting of FIGS. 7A and 7B, illustrate a method performed by a resource manager, computing node, and server, according to one embodiment.
Figure 7B:
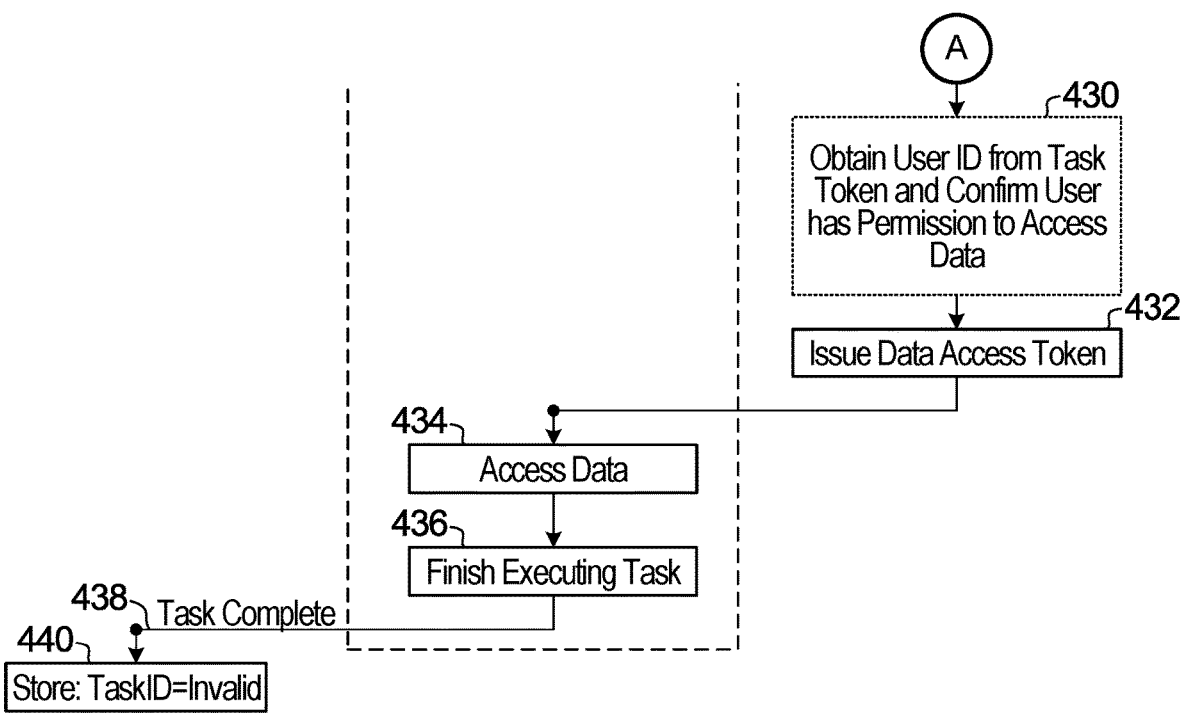

FIG. 7 illustrates a method performed by the resource manager 258, computing node 256, and server 270, according to one embodiment. FIG. 7 consists of FIGS. 7A and 7B. At step 404, the resource manager 258 transmits the user ID and task to the computing node 256. At step 406, the computing node 256 generates a task ID that identifies the task. At step 408, the computing node 256 transmits the task ID to the resource manager 258. At step 410, the resource manager 258 stores an indication in its memory that the task ID is associated with a valid task. The task is considered valid because it was scheduled by the resource manager 258 and the task has not completed execution. As explained later in this method, when the resource manager 258 receives a subsequent message from the computing node 256 indicating the task has completed execution (e.g. indicating the scheduled computing resources associated with the task are now free), then the task is considered no longer valid.

At step 412, the computing node 256 transmits a request for a token to server 270. The requested token is specific to the task and will therefore be referred to as a "task token". The request for the task token includes both: (i) the task ID so that the task token may be tied to the specific task (via the task ID), and (ii) the user ID so that the task token may be tied to the specific user associated with the task (via the user ID). At step 414, the server 270 uses its private key 276 to digitally sign information that includes at least the received user ID and the received task ID, and then the server 270 generates the task token. The task token is a block of information generated by the server 270 that incorporates: the received user ID, the received task ID, and the digital signature. In some embodiments, the digital signature is generated by hashing a data block to generate a hashed value, and then encrypting the hashed value with the server 270's private key 276 to generate the digital signature. The data block that is hashed incorporates or consists of both the user ID and the task ID, such that the generated digital signature incorporates both the user ID and the task ID. In some embodiments, the task token is then generated by appending the digital signature to the data block to result in the task token. At step 416, the task token is transmitted from the server 270 to the computing node 256.

The computing node 256 executes the task associated with the task ID. Execution of the task may begin before or after step 412, depending upon the implementation. In the example illustrated in FIG. 7, execution of the task begins after the task token is received in step 416. Execution of the task is performed by the allocated computing resources on the computing node 256. For example, in a distributed computing system managed by YARN™, a container on computing node 256 may execute the task. During execution of the task, the computing node 256 needs to access data stored in the data storage system 260. For example, the task may involve reading particular data from the data storage system 260 and performing some particular analysis or computation on that data so that the result can ultimately be returned to the user via the user device 252. Access to the data in the data storage system 260 requires a valid data access token. Therefore, at step 418 the computing node 256 transmits a request for a data access token to the server 270. The request includes the task token. At step 420, the task token received at the sever 270 is verified by verifying the digital signature in the received task token. The digital signature verification method performed is implementation specific and depends upon the digital signature algorithm implemented. In one example implementation, step 420 may include the server 270: (i) decrypting the digital signature received in the task token to obtain a first value; (ii) computing a hash of the data block received in the task token (the data block that incorporates or consists of both the received user ID and the received task ID), in order to obtain a second value, and then (iii) confirming that the first value matches the second value. The step of hashing in the verification in this example implementation is the same as the step of hashing used in generating the task token, except that the hashing in the verification uses the information (e.g. task ID and user ID) as received in the received task token. Therefore, the first value and the second value would be different (and verification would fail) if the task token was modified by the computing node 256 or by any malicious interloper. In some embodiments, the same private key 276 is used by the sever 270 to both generate the digital signature and verify the digital signature. In other embodiments, the private key 276 is used by the server 270 to generate the digital signature, and a corresponding public key is used for verifying the digital signature, in which case anyone possessing the public key may perform the verification step. Correct verification of the digital signature at step 420 provides a level of assurance as to the authenticity of the task token. Step 420 may be performed before, after, or in parallel to steps 422 and 424 described below.

At step 422, the server 270 extracts that task ID from the received task token. At step 424, the server 270 transmits a message to the resource manager 258. The message includes the extracted task ID, and the purpose of the message is to query whether the task identified by the task ID is still valid. Validity of the task is tied to whether or not the task is still being executed by the node 256. Therefore, the message is to query whether the task identified by the task ID is still being executed by the computing node 256. At step 426, the resource manager 258 receives the task ID and checks whether the task ID is valid. The resource manager 258 has not yet received a message from the computing node 256 indicating that the task has completed execution (e.g. a message indicating the scheduled computing resources associated with the task are now free). Therefore, the task is still considered valid by the resource manager 258 because, according to the resource manager 258, the task is still being executed by the computing node 256. At step 428, the resource manager 258 transmits a response to the server 270 indicating that the task is valid, i.e. the indicating that the task identified by the task ID is still being executed by the computing node 256.

Optionally, in step 430, the server 270 extracts the user ID from the received task token and uses the received user ID to query memory to confirm whether the user identified by the user ID has permission to access the data in the data storage system 260. The permissions stored in memory may be stored at the server 270 or at another location in the network accessed by the server 270. The permissions may be updated by the server 270 and/or by a network administrator. The permissions implement restrictions on users. A non-exhaustive list of example permissions include:

- A binary permission 'YES' or 'NO' set for each user and stored in a table in memory. The user ID is used to query the table. If the permission associated with the user ID is 'YES', then the user is allowed to access the data stored in the data storage system 260. Otherwise, if the permission associated with the user ID is 'NO', then the user is restricted and not allowed to access the data in the data storage system 260.
- A permission relating to read and write access. For example, each user ID may be associated with an indication of whether the user can read data from the data storage system 260, write data into the data storage system 260, or both. The request to access data sent by the computing node 256 in step 418 may need to indicate whether the data access request is a data read or a data write, and/or the data access token may be limited to a data read or data write depending upon the restriction placed on the user.
- A permission restricting access to only certain types of data for certain users. For example, each user ID may be associated with an indication of what type of data may be accessed. One user may be trusted and permitted to access any data in the data storage system 260, whereas another user may be an external or untrusted user and only able to access a very limited subset of the data, e.g. only read data that is public or anonymized. The request to access data sent by the computing node 256 in step 418 may need to indicate which data is being accessed, and/or the data access token may be limited to only certain types of data depending upon the restriction placed on the user.

A permission allowing data access for only certain types of tasks for each user. For example, each user ID may be associated with an indication of what types of tasks are permitted to be executed by the user using the data, and permission is only granted if the task is a permitted task. For example, a particular user may be allowed to access data in the data storage system 260 for a task that aggregates the data in a table for display, but not allowed to access data in the data storage system 260 for a task that reads the data, modifies the data, and writes the modified data to the data storage system 260. The request to access data sent by the computing node 256 in step 418 may need to indicate the task ID or information relating to the task in order for the permission to be enforced.

A permission allowing data access as a function of: previous tasks or applications executed for the user, and/or previous data accesses by the user. For example, each user ID may be associated with a history of previous data accesses and tasks executed for the user. An algorithm may be employed to search for malicious patterns and deny data access if a malicious pattern is detected, e.g. based on too many data accesses, or based on types of data previously accessed (e.g. if the pattern of data accesses indicates that the user may now have enough information to de-anonymize personal data).

Any one or combination of the permissions described in the list above may be enforced by the server 270 to place a restriction on the data accessed by the user. Step 430 may be performed before, after, or in parallel to any of steps 420 to 428.

At step 432, a data access token is issued and transmitted to the computing node 256. In some embodiments, the data access token may be pre-stored and retrieved from memory of the server 270 or requested by the server 270 from the data storage system 260. In some embodiments, the data access token may be generated by the server 270, in which case the data access token may incorporate the user ID and/or task ID. In some embodiments, the data access token may be valid for a pre-set fixed duration of time, e.g. 10 minutes. In other embodiments, the data access token may have its validity tied to the lifespan of the associated task, e.g. the data access token may incorporate the task ID, which is then used by the data storage system 260 to check the validity of the data access token by determining whether the task associated with the task ID is still executing. The data storage system 260 may determine whether the task associated with the task ID is still executing by querying resource manager 258, like the server 270 did in steps 424 and 428. If the data access token incorporates the user ID and/or task ID, then in some embodiments the data access token further incorporates a digital signature that is generated by the server 270 using the private key 276. The digital signature is generated by the server 270 using the user ID and/or task ID. The digital signature is verified by the data storage system 260 before allowing the data access to occur.

A data access token is only issued and sent to the computing node 256 at step 432 if at step 428 the resource manager 258 indicated that the task associated with the task ID was valid, i.e. that the task identified by the task ID was still being executed by the computing node 256. Otherwise, the server 270 sends a message to the computing node 256 indicating that a data access token has been denied. The message may indicate that the task token is invalid or expired. If optional step 430 is performed, then the data access token issued in step 432 may indicate restrictions on the data access, or a data access token may even be denied if the user does not have permission to access the data in the data storage system 260.

At step 434, the computing node 256 uses the data access token received from the server 270 in order to access the data in the data storage system 260. For example, the computing node 256 transmits, to the data storage system 260, a request to access data. The request includes the data access token. The data storage system 260 confirms the validity of the data access token and facilitates the data access, possibly according to the restrictions associated with the data access token. For example, if the user is only allowed to read data, then the data access token may be restricted to a data read operation, which is enforced by the data storage system 260.

Execution of the task by the computing node 256 continues, and may include multiple data access requests (e.g. by repeating steps 418 to 434), but eventually execution of the task finishes at step 436. Upon task completion, at step 438 the computing node 256 transmits an indication to the resource manager 258 that the task has finished executing. For example, the indication could be in the form of a message indicating that the computing resources associated with the task are again free and ready for another task to be scheduled. The indication may include the task ID. At step 440, the resource manager 258 stores an indication in its memory that the task ID is now associated with an invalid task, i.e. a task that has completed execution.

In some embodiments, the server 270 may store the task token for later retrieval for auditing purposes, e.g. as shown optionally at step 442. The task token associates a particular task (the task ID) with particular user credentials that identify the user (the user ID). Any data access token(s) issued in relation to a task token may also be stored. In this way, an audit can be performed at a later date to identify specifically which user executed which tasks and performed which data accesses.

Technical benefits of the method of FIG. 7 include the following. The task token associates a user with the task that is being executed by the computing node 256, which may allow for the auditing described above. The validity of the task token is tied to the lifespan of the task associated with the task token, rather than to a fixed amount of time. For example, the task token is not set as valid for a fixed amount of time, such as 10 minutes, but remains valid as long as the task is executing, and becomes expired/invalid once the task is finished executing. The task token may also optionally be used to enforce data access control, e.g. to possibly deny or restrict certain users access to certain data or data access operations in the data storage system 260, as described in relation to step 430 above.

In the method of FIG. 7, the resource manager 258 is a computing device trusted by the server 270. For example, in one implementation, user code cannot run on the resource manager 258 and therefore it is assumed that a malicious application is not running on the resource manager 258. In FIG. 7, the communication between the computing node 256 and the resource manager 258 is also trusted. For example, in one implementation the node manager 334 does not run user code and is therefore assumed not to run a malicious application. The node manager 334 tracks which tasks on the computing node 256 are executing and updates the resource manager 258 (e.g. in steps 408 and 438) using encrypted communication. In this way, the resource manager 258 is trusted by the server 270 to indicate whether or not the task is valid (i.e. whether or not the task is still being executed). The server 270 does not have to rely upon a message from the executing task itself indicating that the task is still executing, because the task could be malicious code.

In some embodiments, to further assist in security, the task ID is bound to computing node 256 using a node private key that belongs to the computing node 256. For example, the node manager 334 may use its node private key to sign an information block that includes both the task ID and the node ID, to thereby generate a digital signature. The node ID is an identifier of computing node 256. The request for the task token sent in step 412 may incorporate the digital signature, and the task token generated in step 414 may incorporate the digital signature. Then, when the task ID is extracted in step 422, the digital signature may be verified by the server 270, e.g. using a public key corresponding to the node private key. If the signature is verified, then the server 270 has an assurance that the task ID is associated with a task actually being executed by computing node 256. This prevents a malicious application from using a valid task ID of a different computing node to request a data access token. In some embodiments, the digital signature may not be sent to the server 270 in step 412 and therefore may not be incorporated into the task token, but the digital signature may be transmitted as part of the request for the data access token in step 418.

In some embodiments, to further assist in security, all messages transmitted between the RM 258, computing node 256, and server 270 are encrypted.

Many variations of the method illustrated in FIG. 7 are possible. For example, in some embodiments the computing node 256 does not generate the task ID at step 406, but rather the task ID is generated at the resource manager 258 and transmitted to the node 256 at step 404. In some embodiments, the resource manager 258 and/or the node manager 332 at the computing node 256 actively indicates/pushes any update on the execution status of the task to the server 270, such that the server 270 does not need to query the resource manager 258 to obtain the validity of the task ID, but instead the server 270 may consult its own memory to determine whether or not the task is still executing. In some embodiments, at step 424 the task ID is not sent to the resource manager 258 to determine the validity of the task, but rather the task ID may be sent to another device. This other device may act as a proxy or gateway to the resource manager 258, or this other device may be a separate device that stores and tracks the validity of the task. In some embodiments, at step 424 the task ID is instead sent to the computing node 256 that is associated with the task ID, e.g. if the task ID is signed by the computing node 256 and the signature is verified, then the task ID is sent to computing node 256. The computing node 256 then informs the server 270 of the validity of the task associated with the task ID, i.e. whether the task is still being executed by the computing node 256. In some embodiments, some or all of the operations of server 270 may instead be implemented by node manager 334 on computing node 256. In some embodiments, the user ID and the task ID are a same single ID, or they are separate IDs with one being based on the other. In some embodiments, the user ID is not included in the token and possibly not even present at all in the protocol. For example, in an embodiment described later in relation to FIG. 10, there is no involvement of the user ID. In some embodiments, the resource manager 258 may not be present, e.g. if the functionality of the resource manager 258 is implemented on the server 270, and/or if a single computing node implements both the operations of the resource manager 258 and the operations of the server 270.

In a variation of FIG. 7, prior to step 404 the user device 252 transmits a request to the server 270 for a user submission token. The request for the user submission token includes the user credentials, e.g. the user ID that originates from the login information provided by the user. The server 270 then returns a user submission token to the user device 252. The user submission token incorporates the user ID and is digitally signed such that the user submission token is bound to the user ID. Then, the user submission token is sent with to the resource manager 258 with a request to execute an application. In step 404, the resource manager 258 may transmit the user submission token and task to the computing node 256, rather than the user ID and the task to the computing node 256. The user submission token is used in place of the user ID in FIG. 7. However, the user submission token still identifies the user because it incorporates the user ID. In some embodiments, the server 270 further incorporates a nonce into the user submission token so that a single user submission token cannot be used repeatedly to submit multiple applications.

In some embodiments, there may be a proxy server between the resource manager 258 and the user device 252. The user device 252 instead sends the user submission token and request to execute an application to the proxy server. The proxy server uses the user submission token to obtain an application token, e.g. by sending the user submission token to the server 270 and having the server 270 return an application token that incorporates information from the user submission token and that is digitally signed. The application token may then be forward from the proxy server to the resource manager 258 and used in place of the user submission token. The application token still incorporates the information from the user submission token (e.g. the user ID).

Figure 8:
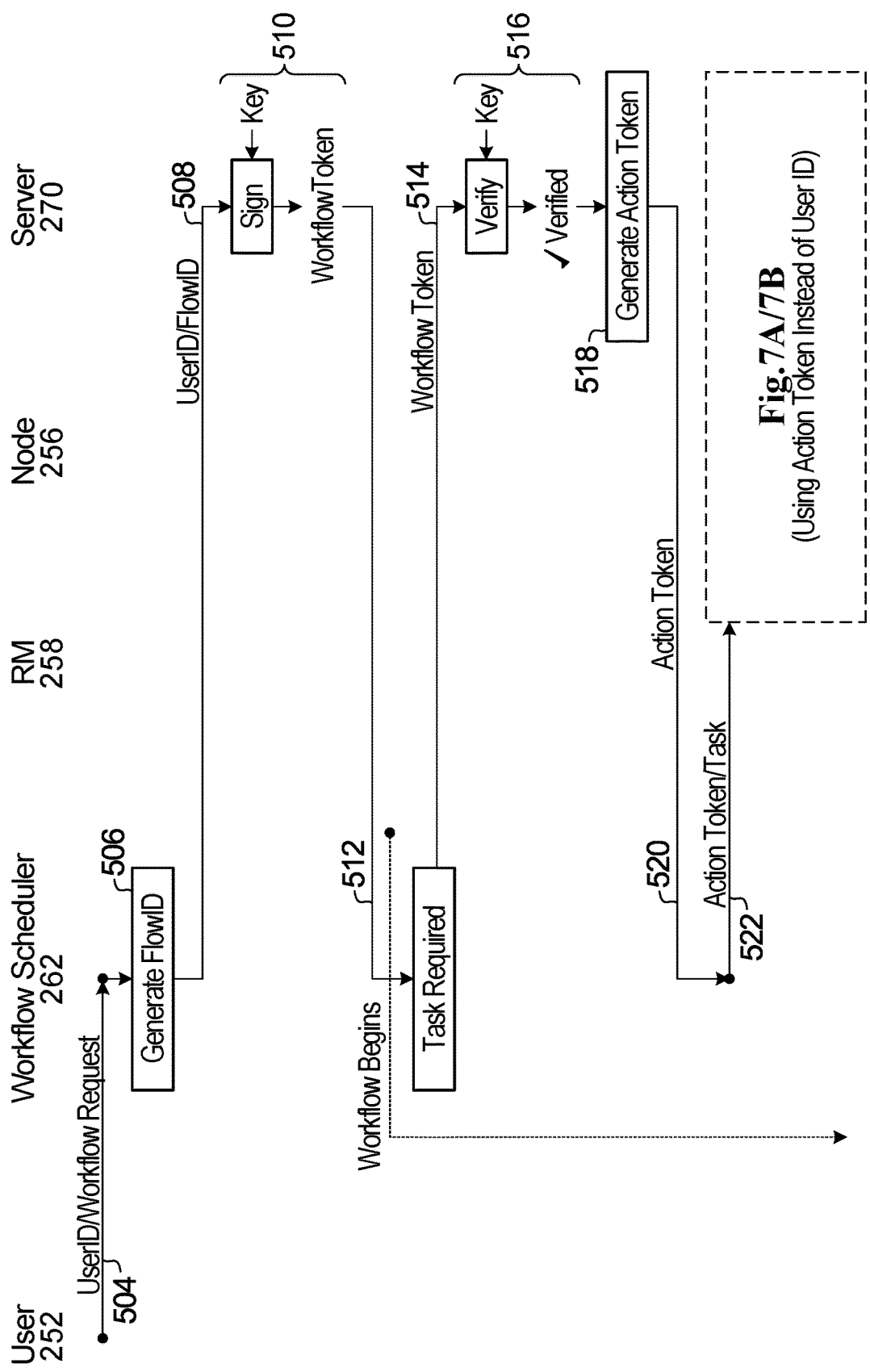
FIG. 8 illustrates a method performed by a user device, workflow scheduler, resource manager, computing node, and server, according to one embodiment.

In some embodiments, the workflow scheduler 262 may submit an application or task to the distributed computing system 254 for execution. FIG. 8 illustrates a method performed by the user device 252, workflow scheduler 262, resource manager 258, computing node 256, and server 270, according to one embodiment.

At step 504, the user device 252 submits a workflow request to the workflow scheduler 262. The workflow request includes information identifying the user. In one embodiment, the information identifying the user are user credentials, e.g. a user ID or user submission token incorporating the user ID. The information identifying the user will be assumed to be a user ID in FIG. 8. At step 506, the workflow scheduler 262 generates a flow ID, which is a unique ID that identifies the workflow. At step 508, the workflow scheduler 262 transmits a request for a workflow token to the server 270. The workflow token is specific to the workflow and includes both: (i) the flow ID so that the workflow token may be tied to the specific workflow (via the flow ID), and (ii) the user ID so that the workflow token may be tied to the specific user associated with the workflow (via the user ID). At step 510, the server 270 uses its private key 276 to digitally sign information that includes at least the received user ID and the flow ID, and then the server 270 generates the workflow token. The workflow token is a block of information generated by the server 270 that incorporates: the received user ID, the received flow ID, and the digital signature. In some embodiments, the digital signature is generated by hashing a data block to generate a hashed value, and then encrypting the hashed value with the server 270's private key 276 to generate the digital signature. The data block that is hashed incorporates or consists of both the user ID and the flow ID. In some embodiments, the workflow token is then generated by appending the digital signature to the data block to result in the workflow token. At step 512, the workflow token is transmitted from the server 270 to the workflow scheduler 262.

The workflow begins, and as part of the workflow a particular task needs to executed by the distributed computing system 254. Therefore, at step 514 the workflow scheduler 262 transmits a request for an action token to the server 270. The request for the action token includes the workflow token. At step 516, the received workflow token is verified by the server 270 by verifying the digital signature in the received workflow token. The digital signature verification method performed is implementation specific and depends upon the digital signature algorithm implemented. In one example implementation, step 516 may include the server 270: (i) decrypting the digital signature received in the workflow token to obtain a first value; (ii) computing a hash of the data block in the received workflow token (the data block that incorporates or consists of both the received user ID and the received flow ID), in order to obtain a second value, and then (iii) confirming that the first value matches the second value. The step of hashing in the verification in this example implementation is the same as the step of hashing used in generating the workflow token, except that the hashing in the verification uses the information (e.g. flow ID and user ID) as received in the received workflow token. Assuming verification is successful, then at step 518 the server 270 generates an action token. The action token incorporates the information from the received workflow token, e.g. the user ID and flow ID. The action token is digitally signed. For example, in one embodiment the action token includes the workflow token and a digital signature that was generated using at least the workflow token. In another embodiment, the action token incorporates the user ID and flow ID and a digital signature that was generated using at least the user ID and the flow ID.

At step 520, the action token is transmitted from the server 270 to the workflow scheduler 262. At step 522, the action token and task is transmitted from the workflow scheduler 262 to the resource manager 258. The method of FIG. 7 is then performed, except that the action token is used in place of the user ID in FIG. 7. However, the action token still identifies the user because it incorporates the user ID.

By performing the method of FIG. 8, each workflow and each task executed as part of a workflow may be tied to a particular user. An audit may therefore be performed to reveal which tasks, workflows, and data accesses are associated with which users.

In a variation of FIG. 8, an action token is not requested or used by the workflow scheduler 262 to submit a task for execution to the distributed computing system 254. Instead, steps 514 to 520 are omitted, and at step 522 the workflow token is used instead of the action token. The method of FIG. 7 is performed, except that the workflow token is used in place of the user ID in FIG. 7. However, the workflow token still identifies the user because it incorporates the user ID.

In some embodiments, the workflow scheduler 262 may be an Oozie™ workflow scheduler, and each workflow may be an Oozie™ flow.

In some embodiments described above in relation to FIG. 7 and/or FIG. 8, the server 270 may be used to establish a chain of trust in the form of a series of signed tokens. Each service in the chain can authenticate to the server 270 and present the preceding token in order to receive a new token for the next service in the chain. The user's identity is propagated through the tokens. Before issuing a data access token to a computing node task, the server 270 uses the information in the task token received from the computing node task to confirm the validity of the computing node task, e.g. to confirm that the computing node task is still running. This may be performed by querying a trusted computing device such as resource manager 258 that tracks which node tasks are still being executed. The information in the task token may be stored for audit purposes, e.g. so that there is a record of node tasks ran and data accessed for each user. The server 270 may also use the information in the task token to enforce user permissions, e.g. to deny a data access token if the user is not permitted to access the data. Permissions can be based on various factors, e.g.: user based (who the user is), job based (what task the user is performing), and/or conditioned on application history (what other tasks has this user already performed).

In some embodiments, a user credential, e.g. user ID, does not necessarily belong to a single person and/or is not necessarily specific to a particular user device 252. The user credentials may instead be a single account used by multiple individuals. For example, the user may be "Engineering Department" or "Accounting Department". A single user ID is associated with each account (e.g. "Engineering Department" has separate user credentials from "Accounting Department").

Figure 9:
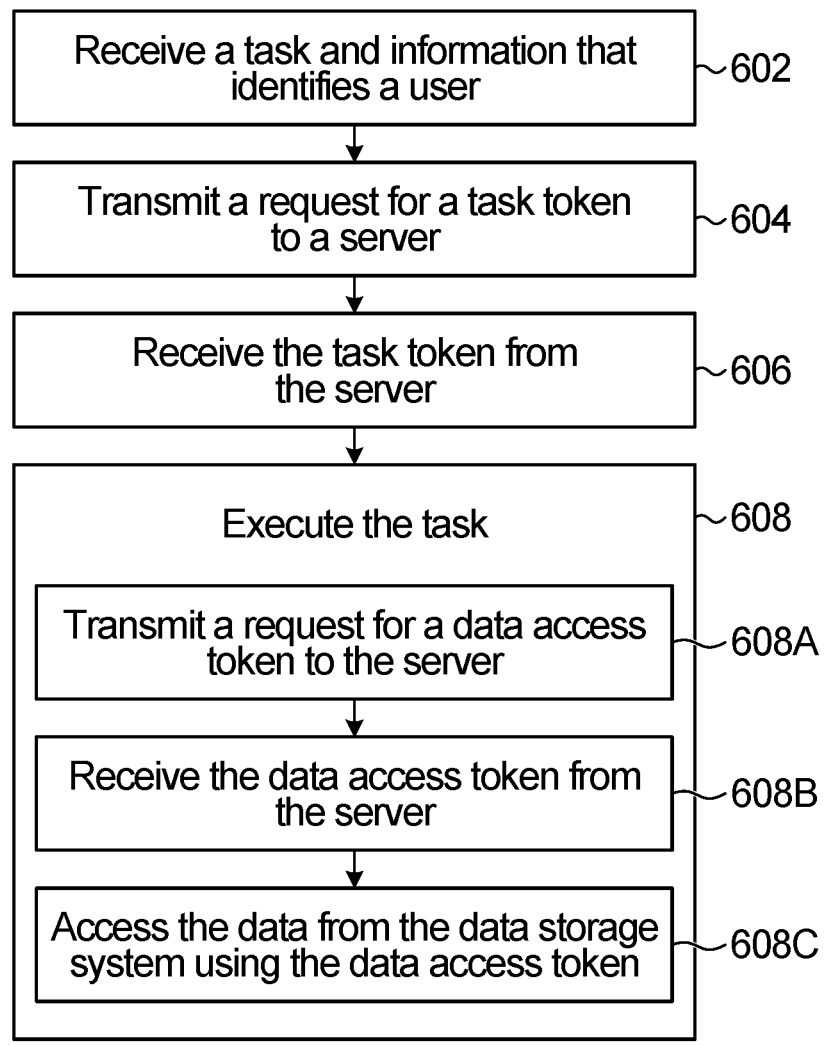
FIG. 9 is a block diagram of a method performed by a computing node, according to one embodiment.

FIG. 9 is a block diagram of a method performed by a computing node, e.g. computing node 256, according to one embodiment. The computing node is a computing device having a processor, a memory, and a network interface to communicate over a computer network. Whenever a network interface is mentioned herein (e.g. network interface 306, 316, 318, 326, 328, 346, 348, 356, or 278), any structure known in the art may be used to implement the network interface. Example structures include: a network interface card (NIC), and/or a computer port (e.g. a physical outlet to which a plug or cable connects), and/or a network socket, etc.

In step 602, the computing node receives (e.g. via a network interface): (i) information that identifies a user, and (ii) a task originating from the user that is scheduled for execution on the computing node. Receiving the task to be executed may include receiving the computer code for the task directly, or receiving an indication of where the compute code for the task is located.

In step 604, the computing node transmits a request for a task token to a server. The request may be transmitted via a network interface. The task token is a token specific to the task. The request for the task token includes: (i) the information that identifies the user, and (ii) a task ID that identifies the task.

In step 606, the computing node receives the task token from the server (e.g. via a network interface). The task token incorporates both the information that identifies the user and the task ID. The task token is digitally signed.

In step 608, the computing node executes the task on the computing node (e.g. using a processor). Step 608 includes the following sub-steps 608A-608C.

In sub-step 608A, the computing node transmits a request for a data access token to the server (e.g. via a network interface). The data access token is a token required to access data stored in a data storage system. The request for the data access token includes the task token.

In response to transmitting the request for the data access token, in step 608B the computing node receives the data access token from the server (e.g. via a network interface).

In step 608C, the computing node accesses the data from the data storage system using the data access token (e.g. via a network interface).

In some embodiments, the computing node is one of a plurality of computing nodes in a distributed computing system, e.g. in distributed computing system 254. In some embodiments, the information that identifies the user and the task are both received from a resource manager (e.g. RM 258) responsible for scheduling tasks on the computing nodes.

In some embodiments, the resource manager is different from the server.

In some embodiments, the method of FIG. 9 further includes: upon completion of executing the task, transmitting an indication that the task is complete. The indication that the task is complete may be transmitted to the resource manager and/or the server. The indication that the task is complete may include an indication that computing resources used to execute the task are now available for use to execute another task. In some embodiments, before execution of the task (or at least before execution of the task is complete), the method of FIG. 9 may further include: the computing node transmitting the task ID to the resource manager to identify the task.

In some embodiments, the information that identifies the user of the computing system comprises a user credential. In some embodiments, the user credential originates from a user input at a user device. The user input may be from a user using the user device that wants to have the task executed.

In some embodiments, the information that identifies the user may be one or more user credentials, such as a user ID, e.g. that is received via a user input as part of login information provided by the user.

In all embodiments described herein, the user may be a human, or an account, or another computer, or the user's computing device, or a computer application. The following are therefore some other examples of information that may identify the user, e.g. in step 602: the ID of the user's device (e.g. the ID of user device 252); and/or an account ID; and/or an ID of a computer; and/or an ID of a computer application, etc. In some embodiments, the user ID and the user's device ID is the same ID.

In some embodiments, a digital signature in the task token incorporates both the information that identifies the user and the task ID. The digital signature may have been applied by the server, e.g. the server may have obtained the digital signature using the information that identifies the user and the task ID. In some embodiments, the digital signature is included in the task token in addition to the information that identifies the user and the task ID.

In some embodiments, the method of FIG. 9 further includes: using a private key to obtain a digital signature by digitally signing information that includes both the task ID and an identifier of the computing node, and then including the digital signature in the request for the task token and/or in the request for the data access token.

In some embodiments, the data access token incorporates the task ID and/or the information identifying the user. In some embodiments, the data access token incorporates a digital signature that is generated using the task ID and/or the information identifying the user.

In some embodiments, the information that identifies the user and that is received from the resource manager is: (i) incorporated into a submission token that originates from the user, or (ii) incorporated into a token that originates from a workflow scheduler.

In some embodiments, a computing node may be configured to perform the method of FIG. 9 or any of its variations. The computing node may include a processor, a memory, and at least one network interface. The at least one network interface may be configured to: (A) receive both (i) information that identifies a user, and (ii) a task originating from the user that is scheduled for execution on the computing node; (B) transmit a request for a task token to a server, where the task token is a token specific to the task, and where the request for the task token includes: (i) the information that identifies the user, and (ii) a task ID that identifies the task; and (C) receive the task token from the server, where the task token incorporates the information that identifies the user and the task ID, and the task token is digitally signed. The processor may be configured to execute the task on the computing node, and during the execution of the task the at least one network interface may be configured to: (A) transmit a request for a data access token to the server, where the data access token is a token required to access data stored in a data storage system, and where the request for the data access token includes the task token; (B) in response to transmitting the request for the data access token, receive the data access token from the server; and (C) transmit the data access token to the data storage system to access the data.

Figure 10:
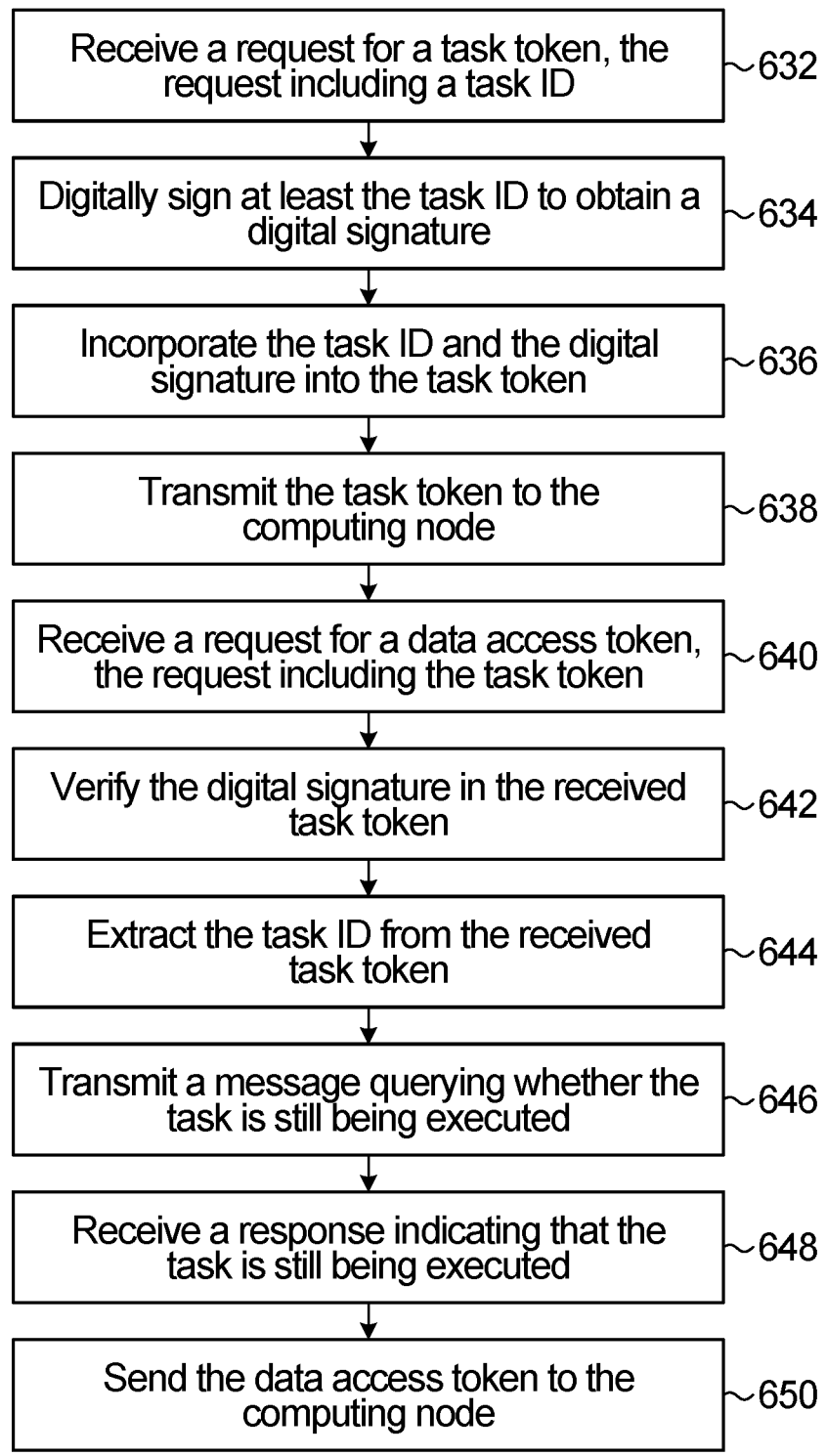
FIG. 10 is a block diagram of a method performed by a server, according to one embodiment.

FIG. 10 is a block diagram of a method performed by a server, e.g. server 270, according to one embodiment. The server is a computing device having a processor, a memory, and a network interface to communicate over a computer network.

In step 632, the server receives (e.g. via a network interface) a request for a task token from a computing node. The task token is a token specific to a task scheduled for execution on the computing node, and the request for the task token includes a task ID that identifies the task.

In step 634, the server digitally signs at least the task ID to obtain a digital signature. In step 636, the server incorporates the task ID and the digital signature into the task token. Steps 634 and 636 may be performed by the processor of the server.

In step 638, the server transmits the task token to the computing node (e.g. via a network interface).

In step 640, the server subsequently receives a request for a data access token from the computing node (e.g. via a network interface). The data access token is a token required to access data stored in a data storage system, and the request for the data access token includes the task token.

In step 642, the server verifies the digital signature of the task token received in the request for the data access token. In step 644, the server extracts the task ID from the task token received in the request for the data access token. Steps 642 and 644 may be performed by a processor.

In step 646, the server transmits a message to a computing device (e.g. via a network interface). The message includes the task ID, and the message queries whether the task identified by the task ID is still being executed by the computing node. The computing device is different from the computing node and server. The computing device may be a resource manager, e.g. resource manager 258.

In step 648, the server receives a response from the computing device (e.g. via a network device). The response indicates that the task identified by the task ID is still being executed by the computing node.

Subsequent to receiving the response, in step 650 the server sends the data access token to the computing node (e.g. via a network device).

In some embodiments, the task originates from a user and the request for the task token also includes information that identifies the user. In some embodiments, the information that identifies the user is also digitally signed by the server to obtain the digital signature. In some embodiments, the information that identifies the user is also incorporated into the task token.

In some embodiments, the computing node is one of a plurality of computing nodes in a distributed computing system. In some embodiments, the computing device is a resource manager responsible for scheduling tasks on the computing nodes.

In some embodiments, the method of FIG. 10 further includes storing the task token in memory for retrieval during an audit.

In some embodiments, the method of FIG. 10 further includes: extracting the information identifying the user from the task token received in the request for the data access token, and using the information identifying the user to determine a restriction on the user in relation to accessing the data in the data storage system. In some embodiments, the method further includes indicating the restriction in the data access token and/or in information sent to the computing node along with the data access token.

In some embodiments, the restriction includes at least one of the following: the user does not have permission to read the data in the data storage system; and/or the user does not have permission to write data to the data storage system; and/or the user has access to only certain data in the data storage system.

In some embodiments, the server also uses the task ID to determine the restriction. The restriction may comprise the user only being able to access certain data in the data storage system for the task identified by the task ID.

In some embodiments, the digital signature is obtained by using a private key of the server to digitally sign a data block that includes at least the task ID and the information that identifies the user. In some embodiments, the task token includes the digital signature, the task ID, and the information that identifies the user. In some embodiments, the task token is obtained by appending the digital signature to the data block.

In some embodiments, the digital signature is a first digital signature, the task ID is bound to an identity of the computing node using a second digital signature, and the second digital signature is received from the computing node. In some embodiments, the second digital signature is verified by the server prior to sending the data access token to the computing node. In some embodiments, the second digital signature is received in the request for the task token and/or in the request for the data access token.

In some embodiments, the server incorporates the task ID and/or the information identifying the user into the data access token.

In some embodiments, the information that identifies the user may be one or more user credentials, such as a user ID, e.g. that is received via a user input as part of login information provided by the user.

In some embodiments, the computing device is a resource manager, the information that identifies the user is ultimately received from the resource manager, and the information that identifies the user is: (i) incorporated into a submission token that originates from a user device, or (ii) incorporated into a token that originates from a workflow scheduler In some embodiments, a server may be configured to perform the method of FIG. 10 or any of its variations. The server may include a processor, a memory, and at least one network interface. The at least one network interface may be configured to receive a request for a task token from a computing node. The task token is a token specific to a task scheduled for execution on the computing node, and the request for the task token includes a task ID that identifies the task. The processor may be configured to digitally sign at least the task ID to obtain a digital signature, and incorporate the task ID and the digital signature into the task token. The at least one network interface may be configured to: transmit the task token to the computing node, and subsequently receive a request for a data access token from the computing node, where the data access token is a token required to access data stored in a data storage system, and where the request for the data access token includes the task token. The processor may be configured to: verify the digital signature of the task token received in the request for the data access token, and extract the task ID from the task token received in the request for the data access token. The at least one network interface may be configured to: (A) transmit a message to a computing device, the message including the task ID and the message querying whether the task identified by the task ID is still being executed by the computing node; (B) receive a response from the computing device, the response indicating that the task identified by the task ID is still being executed by the computing node; and (C) subsequent to receiving the response, send the data access token to the computing node.

Figure 11:
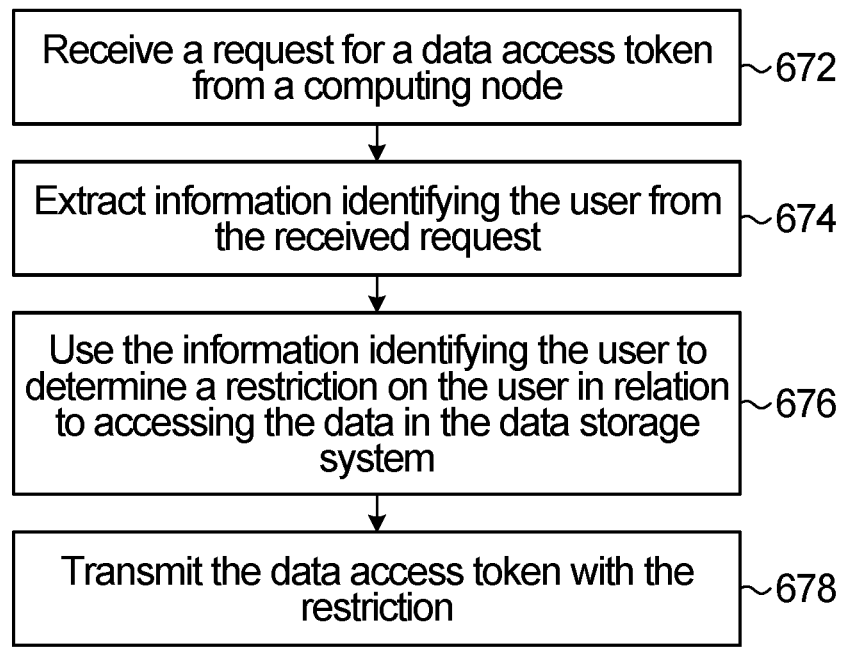
FIG. 11 is a block diagram of a method performed by a server, according to another embodiment.

FIG. 11 is a block diagram of a method performed by the server, e.g. server 270, according to another embodiment.

In step 672, the server receives a request for a data access token from a computing node. The data access token is a token required to access data stored in a data storage system. The request for the data access token includes information identifying the user. In some embodiments, the request for the data access token may also include information identifying a task ID. In some embodiments, the request for the data access token may include a task token.

In step 674, the server extracts the information identifying the user from the received request for the data access token. In some embodiments, the information identifying the user may be extracted from a received task token. In some embodiments, the received task token may incorporate a digital signature that is verified by the server.

In step 676, the server uses the information identifying the user to determine a restriction on the user in relation to accessing the data in the data storage system. Examples of restrictions are discussed earlier. For example, a restriction may include at least one of the following: the user does not have permission to read the data in the data storage system; and/or the user does not have permission to write data to the data storage system; and/or the user has access to only certain data in the data storage system.

In step 678, the server transmits the data access token with the restriction. The restriction itself may be identified in the data access token, and/or the restriction may be indicated separate from the data access token.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by a server in a computing system, the method comprising:
receiving a data access token request from a computing node, the data access token request including a task identifier (ID) identifying a task, and wherein the data access token is a token required to access data stored in a data storage system, and wherein the computing node requires the data stored in the data storage system during execution of the task;
verifying a digital signature associated with the data access token request;
extracting, from the data access token request, the task ID identifying the task;
transmitting a message to a computing device, the message including the task ID that was extracted from the data access token request, and the message querying whether the task identified by the task ID is still being executed by the computing node;
receiving a response from the computing device, the response not including the data access token and the response indicating that the task identified by the task ID is still being executed by the computing node;
subsequent to receiving the response indicating that the task identified by the task ID is still being executed by the computing node, sending the data access token to the computing node, thereby causing the computing node to continue execution of the task, the executing to use the data access token.

2. The method of claim 1, wherein the data access token request includes the digital signature.

3. The method of claim 2, further comprising:
prior to receiving the data access token request, receiving a request for a task token from the computing node, wherein the task token is a token specific to the task, and wherein the request for the task token includes the task ID;
digitally signing at least the task ID to obtain the digital signature, and incorporating the task ID and the digital signature into the task token; and
transmitting the task token to the computing node, wherein the data access token request includes the task token.

4. The method of claim 3, wherein the task originates from a user, wherein the request for the task token also includes information that identifies the user, wherein the information that identifies the user is also digitally signed by the server to obtain the digital signature, and wherein the information that identifies the user is provided by the task token.

5. The method of claim 1, further comprising:
extracting information identifying a user from the data access token request;
using the information identifying the user to determine a restriction on the user in relation to accessing the data in the data storage system; and
indicating the restriction in the data access token and/or in information sent to the computing node along with the data access token.

6. The method of claim 5, wherein the restriction comprises at least one of the following:
the user does not have permission to read the data in the data storage system;
the user does not have permission to write data to the data storage system; and/or
the user has access to only certain data in the data storage system.

7. The method of claim 5, further comprising:
using the task ID to determine the restriction,
wherein the restriction comprises the user only being able to access certain data in the data storage system for the task identified by the task ID.

8. The method of claim 1,
wherein the digital signature is obtained by the server using a private key to digitally sign a data block that includes at least the task ID and information that identifies a user,
wherein the data access token request comprises the digital signature, the task ID, and the information that identifies the user.

9. The method of claim 1, wherein the digital signature is a first digital signature, wherein the task ID is bound to an identity of the computing node using a second digital signature, wherein the second digital signature is received from the computing node, and wherein the second digital signature is verified by the server prior to sending the data access token to the computing node.

10. The method of claim 1, wherein the server incorporates the task ID and/or information identifying a user into the data access token.

11. A server comprising:
a processor;

a memory; and at least one network interface;

wherein the at least one network interface is to receive a data access token request from a computing node, the data access token request including a task identifier (ID) identifying a task, and wherein the data access token is a token required to access data stored in a data storage system, and wherein the computing node requires the data stored in the data storage system during execution of the task;

wherein the processor is to: verify a digital signature associated with the data access token request and extract, from the data access token request, the task ID identifying the task;

wherein the at least one network interface is further to:
transmit a message to a computing device, the message including the task ID that was extracted from the data access token request, and the message querying whether the task identified by the task ID is still being executed by the computing node;

receive a response from the computing device, the response not including the data access token and the response indicating that the task identified by the task ID is still being executed by the computing node;

subsequent to receiving the response indicating that the task identified by the task ID is still being executed by the computing node, send the data access token to the computing node, thereby causing the computing node to continue execution of the task, the executing to use the data access token to access the data from the data storage system.

12. The server of claim 11, wherein the data access token request includes the digital signature.

13. The server of claim 11, wherein:

prior to receiving the data access token request, the at least one network interface is to receive a request for a task token from the computing node, wherein the task token is a token specific to the task, and wherein the request for the task token includes the task ID;

the processor is to digitally sign at least the task ID to obtain the digital signature, and incorporate the task ID and the digital signature into the task token; and the at least one network interface is further to: transmit the task token to the computing node;

wherein the data access token request includes the task token.

14. The server of claim 13, wherein the task originates from a user, wherein the request for the task token is to also include information that identifies the user, wherein the information that identifies the user is also to be digitally signed by the processor to obtain the digital signature, and wherein the information that identifies the user is to be provided by the task token.

15. The server of claim 11, wherein the processor is to: extract information identifying a user from the data access token request; use the information identifying the user to determine a restriction on the user in relation to accessing the data in the data storage system; and indicate the restriction in the data access token and/or in information to be sent to the computing node along with the data access token.

16. The server of claim 15, wherein the restriction comprises at least one of the following: the user does not have permission to read the data in the data storage system; the user does not have permission to write data to the data storage system; and/or the user has access to only certain data in the data storage system.

17. The server of claim 15, wherein the processor is to use the task ID to determine the restriction, wherein the restriction comprises the user only being able to access certain data in the data storage system for the task identified by the task ID.

18. The server of claim 11, wherein the processor is to obtain the digital signature by using a private key of the server to digitally sign a data block that includes at least the task ID and information that identifies a user, wherein the data access token request is to include the digital signature, the task ID, and the information that identifies the user.

19. The server of claim 11, wherein the digital signature is a first digital signature, wherein the task ID is bound to an identity of the computing node using a second digital signature, wherein the at least one network interface is to receive the second digital signature from the computing node, and wherein the processor is to verity the second digital signature prior to the data access token being sent to the computing node.

20. The server of claim 11, wherein the processor is to incorporate the task ID and/or information identifying a user into the data access token.

21. A non-transitory computer-readable medium having stored thereon computer-executable instructions that, when executed by at least one processor, cause the at least one processor to perform operations comprising:

receiving a data access token request from a computing node, the data access token request including a task identifier (ID) identifying a task, and wherein the data access token is a token required to access data stored in a data storage system, and wherein the computing node requires the data stored in the data storage system during execution of the task;

verifying a digital signature associated with the data access token request;

extracting, from the data access token request, the task ID identifying the task;

transmitting a message to a computing device, the message including the task ID that was extracted from the data access token request, and the message querying whether the task identified by the task ID is still being executed by the computing node;

receiving a response from the computing device, the response not including the data access token and the response indicating that the task identified by the task ID is still being executed by the computing node;

subsequent to receiving the response indicating that the task identified by the task ID is still being executed by the computing node, sending the data access token to the computing node, thereby causing the computing node to continue execution of the task, the executing to use the data access token.

* * * * *